United States Patent
Chipchase

(10) Patent No.: US 8,244,288 B2
(45) Date of Patent: Aug. 14, 2012

(54) CONTEXT-SENSITIVE DATA HANDLING

(75) Inventor: Jan Chipchase, Tokyo (JP)

(73) Assignee: Nokia Corporation, Espoo (FI)

( * ) Notice: Subject to any disclaimer, the term of this patent is extended or adjusted under 35 U.S.C. 154(b) by 1146 days.

(21) Appl. No.: 11/988,017

(22) PCT Filed: Apr. 28, 2006

(86) PCT No.: PCT/IB2006/001629
§ 371 (c)(1),
(2), (4) Date: Feb. 25, 2008

(87) PCT Pub. No.: WO2007/003995
PCT Pub. Date: Jan. 11, 2007

(65) Prior Publication Data
US 2009/0209203 A1    Aug. 20, 2009

(30) Foreign Application Priority Data
Jun. 30, 2005 (EP) .................. 05254140

(51) Int. Cl.
*H04B 7/00* (2006.01)
*H04B 15/00* (2006.01)

(52) U.S. Cl. ...... 455/502; 455/41.2; 455/41.3; 455/500; 455/556.1; 455/556.2; 455/564; 455/566; 455/418

(58) Field of Classification Search ........ 455/41.1–41.3, 455/500, 502, 556.1–556.2, 557, 564–566, 455/90.1–90.3, 552.1, 553.1, 418–420
See application file for complete search history.

(56) References Cited

U.S. PATENT DOCUMENTS

| | | | |
|---|---|---|---|
| 6,351,645 B1 * | 2/2002 | Suzuki et al. | 455/458 |
| 6,697,638 B1 * | 2/2004 | Larsson et al. | 455/553.1 |
| 6,754,468 B1 * | 6/2004 | Sieben et al. | 455/41.2 |
| 7,174,130 B2 * | 2/2007 | Kurisko et al. | 455/41.2 |
| 7,409,231 B2 * | 8/2008 | Oba et al. | 455/566 |
| 7,532,196 B2 * | 5/2009 | Hinckley | 345/156 |
| 2003/0125057 A1 | 7/2003 | Pesola | |
| 2004/0048570 A1 | 3/2004 | Oba et al. | |
| 2004/0203381 A1 * | 10/2004 | Cahn et al. | 455/41.2 |
| 2005/0093868 A1 | 5/2005 | Hinckley | |

FOREIGN PATENT DOCUMENTS

| | | |
|---|---|---|
| CN | 1416291 A | 5/2003 |
| EP | 1 492 307 | 12/2004 |
| EP | 1 492 307 A1 | 12/2004 |
| JP | 2004-165-705 * | 6/2004 |

(Continued)

OTHER PUBLICATIONS

Chinese Office action for corresponding CN App. No. 200680023706.3 dated Apr. 29, 2010, pp. 1-6.

(Continued)

*Primary Examiner* — Tuan A Tran
(74) *Attorney, Agent, or Firm* — Ditthavong Mori & Steiner, P.C.

(57) ABSTRACT

A method for communicating data between devices, comprising the steps of: receiving data at a first user device; the first user device automatically selecting, in dependence on the nature of an activity being made available to a user by the first user device, a way of integrating the data with a functionality of the first user device; and integrating the transmitted data with the functionality in the selected way.

29 Claims, 2 Drawing Sheets

FOREIGN PATENT DOCUMENTS

| | | |
|---|---|---|
| JP | 2004-165705 A | 6/2004 |
| WO | WO 01/22262 A2 | 3/2001 |
| WO | WO 03/021876 A1 | 3/2003 |

OTHER PUBLICATIONS

Context-Aware Services for Mobile Users, Kolari et al., VTT Publication 539, XP-002365900, Espoo, 2004, pp. 1-173.

European Office action for corresponding EP App. No. 09168317.7-1244 dated Jun. 18, 2010, pp. 1.

Extended European Search Report for corresponding EP App. No. 09168317.7-1244 dated Sep. 10, 2009, pp. 1-5.

European Office Action dated Mar. 10, 2008.

Kolari, Johna, Laakko et al., "Context-Aware Services for Mobile Users", VTT Publications, XP002365900, Finland, 2004.

Japanese office action for corresponding JP patent application No. 2008-518994 dated Sep. 6, 2010, pp. 1-6.

Chinese Office action for corresponding CN App. No. 201010523102.3 dated Jul. 26, 2011, pp. 1-8.

Japanese Office Action for corresponding JP Application No. 2008-518994 dated Oct. 17, 2011, pp. 1-6.

Office Action for related Chinese Application No. 201010523102.3 dated Jun. 6, 2012, pp. 1-15.

* cited by examiner

CONTEXT-SENSITIVE DATA HANDLING

The present invention relates to a user device which is capable of context-sensitive handling of data received at the device.

It is anticipated that it will become increasingly common for users to carry around multiple devices, each optimised for a particular use. For example, in the course of a day a user may require a mobile phone, a PDA (personal data assistant) and a digital camera. A user is likely to want to transfer data between his or her devices in order to take advantage of the different functionalities of the devices. For instance, a user may wish to send images taken on a digital camera to a friend and would therefore wish to transfer the images from the digital camera to a PDA.

There are various technologies available for transferring data between user devices, ranging from wire-based data transfer solutions, such as FireWire or USB, to wireless data transfer solutions, such as Bluetooth or IEEE802.11. However, irrespective of the data transfer architecture, in conventional user devices the user of the device receiving the data is required to interrupt whichever task they are performing in order to deal with the received data in the desired way. This is particularly inconvenient when the task is a real-time interaction with another user, such as an instant messaging conversation.

Conventionally, user devices deal with all received data of a given type in the same way, regardless of the task being performed at the user device. For instance, a message received at a PDA is stored in the message inbox. This behaviour does not vary depending upon whether, for example, the user is currently making a call on the PDA or browsing the internet.

A user performing a task at a user device will frequently want to utilise data received at the user device in the same way each time that particular task is being performed. This requires the user to repeat the same handling steps each time data is received and the user is performing that particular task. Such a requirement is time consuming, particularly if the task is a common one, and it requires the user to interrupt whichever task they are performing.

It is therefore desirable to provide a user device which is capable of automatically handling received data in a way which is appropriate for the task being performed at the device, and which does not interrupt the task the user is performing. It is further desirable that user device handles the received data in a way which is intuitive and natural to the user.

According to a first aspect of the present invention there is provided a method for communicating data between devices, comprising the steps of: receiving data at a first user device; the first user device automatically selecting, in dependence on the nature of an activity being made available to a user by the first user device, a way of integrating the data with a functionality of the first user device; and integrating the transmitted data with the functionality in the selected way.

Suitably the method further comprises the steps of: selecting at a second user device data for transmission to the first user device; transmitting the selected data from the second user device to the first user device.

Preferably the method further comprises the step of storing the data at the first user device.

Suitably the step of selecting a way of integrating the data with a functionality of the first user device is further dependent on the nature of the second user device. Suitably the step of selecting a way of integrating the data with a functionality of the first user device is further dependent on the nature of the data.

Preferably the step of transmitting the data from a second user device to a first user device is automatically performed when the first and second devices enter into proximity with one another. Suitably the first and second devices include radio frequency identification transponders. Suitably the step of transmitting data from the second user device to the first user device is triggered by user input means at the second user device.

The first and second user devices may be considered proximate when the devices are separated by a predetermined distance of less than or equal to 30 cm, or 20 cm, or 10 cm, or 5 cm, or 1 cm. The first and second user devices may be considered proximate when the signal strength received by one device from the other exceeds a predetermined threshold. The devices may be required to physically touch in order to be considered proximate.

Preferably the integrating step is performed in accordance with a set of predetermined rules. Suitably the rules are stored on the first user device. Suitably the rules are stored remotely from the first user device.

Preferably the method further comprises the step of the first and second user devices authenticating one another prior to the transmitting step. Suitably at least the first user device accesses a set of permissions containing information necessary for the authenticating step. Suitably the permissions are stored at the first user device. Suitably the permissions are stored remotely from the first user device.

Preferably the first and second user devices communicate in accordance with the Bluetooth architecture. Suitably the first and second user devices must be paired at least in the first instance that the first and second user devices attempt to communicate. Suitably the first and second user devices communicate in accordance with a wireless network architecture.

In one embodiment the functionality is offered at least in part by a computer program having instant messaging capabilities and the integrating step involves sending the data to an instant messenger contact. In another embodiment the functionality is offered at least in part by a computer program having messaging capabilities and the integrating step involves attaching the data to a message. In another embodiment the functionality is offered at least in part by a computer program having image display capabilities, the data represents an image, and the integrating step involves displaying the image. In another embodiment the functionality is offered at least in part by a computer program having web browsing capabilities, the data represents a web link, and the integrating step involves accessing data stored at the link.

Suitably the data represents a sum of money or a form of electronic payment. Suitably the integrating step involves transferring money or a form of electronic payment to or from the first user device.

Suitably the data may be user-content data. Suitably the data may be in the format of a user-content file.

Suitably the activity being made available to a user is a real-time communications activity. Suitably the activity is a telephone conversation. Suitably the activity is instant messaging.

Preferably the data comprises: primary data for interpretation at an application level; and secondary data indicating a format in which the primary data is to be interpreted.

According to a second aspect of the present invention there is provided a user device comprising: a receiver for receiving data from another user device; processing means arranged to automatically select, in dependence on the nature of an activity being made available to a user by the second user device, a way of integrating the data with a functionality of the second user device, and to integrate the transmitted data with the functionality in the selected way.

The present invention will now be described by way of example with reference to the figures.

Figure 1:
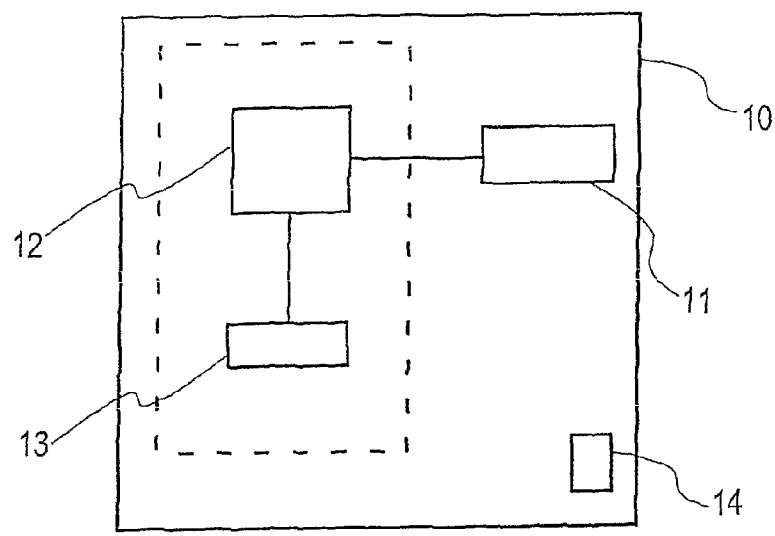
FIG. 1 shows a user device of the preferred embodiment.

FIG. 1 shows a user device 10 of a preferred embodiment comprising a receiver 11, a processor 12 and integrating means 13 for integrating the received data with a functionality of the user device. Integrating means 13 may form part of processor 12. Alternatively, the integrating means may be embodied separately in hardware or software, or in some combination of hardware and software. At least part of processor 12 may be embodied in software. The user device further comprises a radio frequency identification (RFID) transponder 14.

Figure 2:
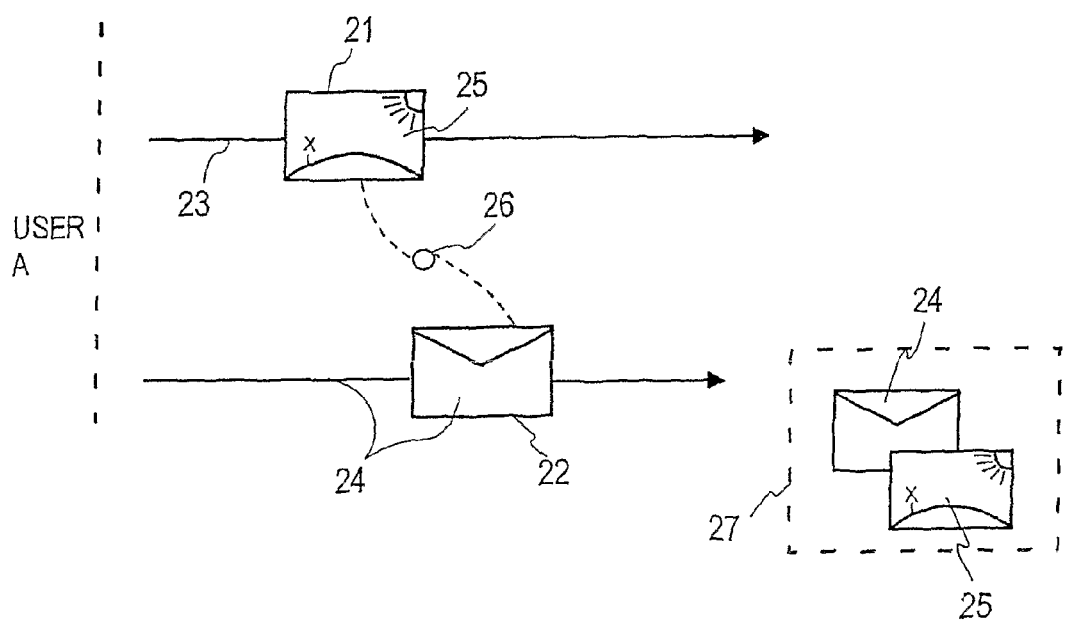
FIG. 2 shows a communication event in accordance with a first embodiment of the present invention.

FIG. 2 shows a first embodiment of the present invention in which both device 21 and a device 22 belong to user A. In this embodiment, user A is multitasking: browsing through images 23 on device 21 while writing a message 24 on device 22. User A may decide to attach one of the images 25 displayed on device 21 to the message being written on device 22. With the desired image displayed on device 21, user A initiates transmission of the image to device 22 by, for example, touching the devices together 26 (discussed below). Upon receiving the image, device 22 recognizes that the user is writing a message and automatically attaches the image to that message 27.

The user device may store a set of rules which determine how received data is integrated with a functionality of the user device. The rules may be a set of context definitions which specify how the data is integrated in dependence on the activity being performed at the user device. The rules may further specify how the data is integrated in dependence on the nature of the data. Alternatively, the rules may further specify how the data is integrated in dependence on the nature of the transmitting device. There may be default rules to specify how data is integrated in cases in which the activity or data type are not explicit in the rule set.

The rules may be defined by a user or may be set by the manufacturer or supplier of a user device. The user may be able to define new rules to cope with new or previously unsupported data types, new applications available to the user at the user device or new types of devices capable of communicating with the user device.

Alternatively, one or more algorithms accessible at the user device may determine how received data is integrated with a functionality of the user device. The algorithms may generate one or more rules when the data is received at the user device.

In many situations it may be possible to integrate data received at a user device with several different functionalities and for each functionality it may be possible to integrate the received data with that functionality in several different ways. For example, if a user device receives a music file while a user is browsing the internet on that user device, the user device could be configured to integrate the music file data with a functionality of the user device in several ways. One such way would be to automatically enter information from the music file into an internet search engine so that the user could find out, for example, about other tracks by the same artist or background information about the music track and artist. Another way would be for the user device to recognise that the user is browsing the internet and to therefore store the music track at the user device (or another storage location accessible from the user device) for later listening.

Preferably a user device is configured to integrate a particular type of data with a functionality of the user device in the way most likely to be desired by the user. Preferably a user device handles received data according to a set of simple rules. This allows a user to quickly learn how and with which functionality a given user device will automatically integrate a particular type of received data. A user may therefore predict the way in which a given user device will handle data received from another user device and exploit the preferred embodiments present invention to best effect.

There may be provided a way of overruling the automatic data handling at the receiving user device, for example, through setting a device parameter, or by inputting a key or button sequence before, during or after data transmission. This could be done at either the transmitting or receiving user devices.

The data transfer may be achieved by any of the various data transfer architectures known in the art, such as Bluetooth, IEEE802.11 or infrared. Data transfer may be effected over a wireline connection, but preferably the connection is wireless.

The user device may be a mobile phone, smartphone or personal data assistant (PDA). The user device may be a laptop computer, a desktop computer or a storage device. The user device may be a display screen, a digital camera or a device for playing digital media such as videos and music.

Figure 3:
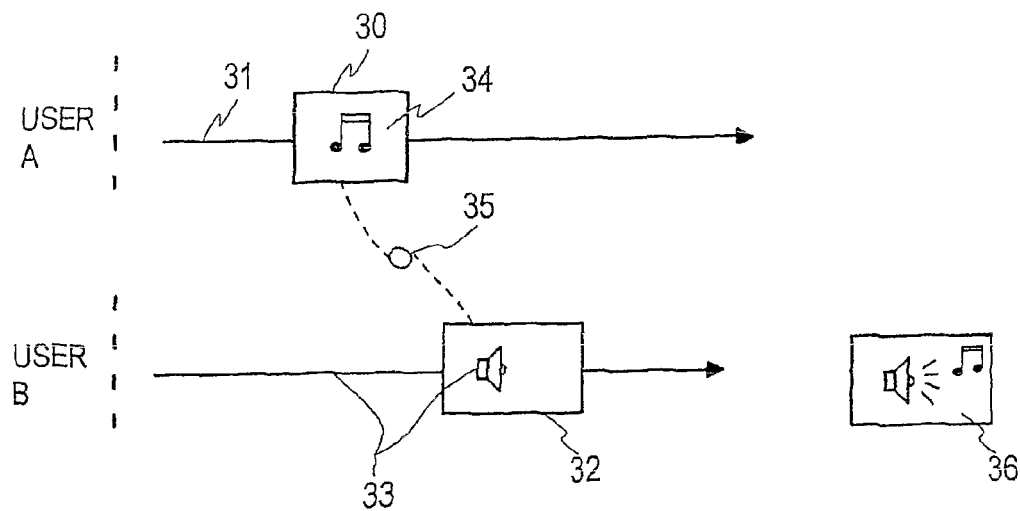
FIG. 3 shows a communication event in accordance with a second embodiment of the present invention.

FIG. 3 shows a second embodiment of the invention in which device 30 and device 32 belong to different users. In this embodiment user A is browsing music files 31 on device 30 and user B is using a music player 33 on device 32. User B may wish to play one of the music files accessible at device 30 on device 32. User A therefore selects the desired music file 34 at device 30 and transmits the data to device 32 by touching the devices together 35. Upon receiving the music file, device 32 recognizes that the music player is active and automatically starts playing the music file 36.

Figure 4:
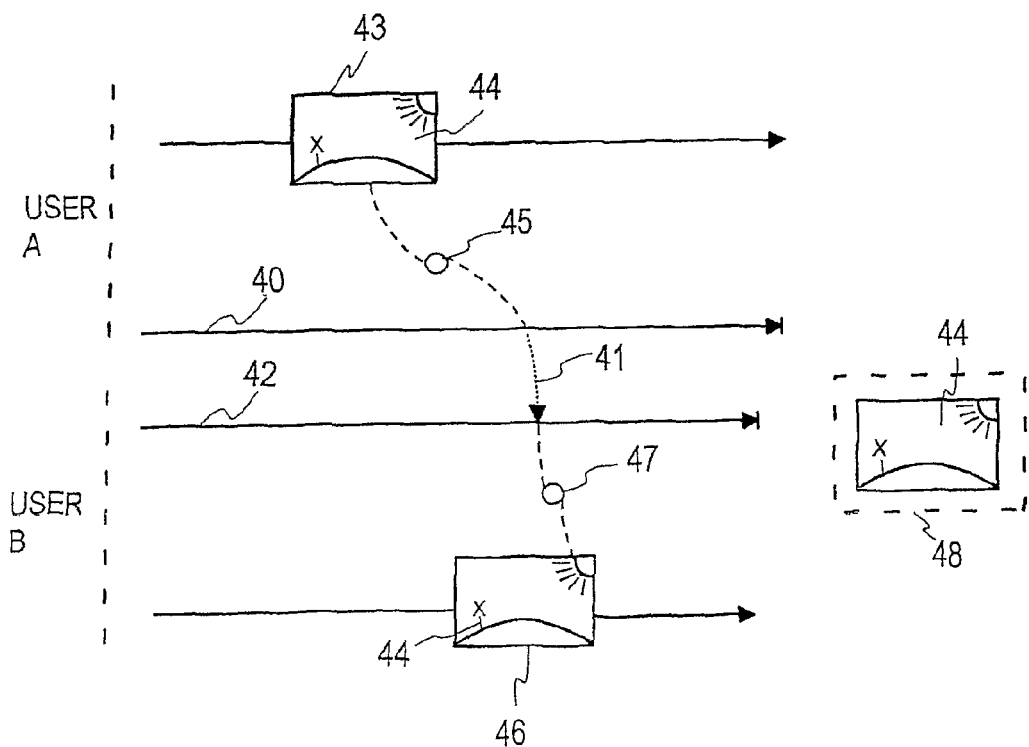
FIG. 4 shows a communication event in accordance with a third embodiment of the present invention.

FIG. 4 shows a third embodiment of the invention in which users A and B are holding a telephone conversation 41 (or some other form of data exchange, such as instant messaging) between devices 40 and 42. User A is multitasking and is also viewing images on a second device 43. The second device may be an image viewer, a dedicated content player or a local infrastructure device. User A decides to transmit the image 44 being displayed on the image viewer to user B and therefore touches 45 device 43 to device 40 in order to transfer the image from device 43 to device 40 of user A. Device 40 recognises that user A is holding a telephone conversation with user B and transmits the image to device 42 of user B. The data may be transmitted between device 40 and device 42 using any suitable means: for example, as digital data over the voice channel(s), as an attachment to a multimedia message or email, or over the internet using an appropriate data transfer protocol.

If user B has an image viewer 46 then user B may transfer the image 44 received at device 42 to the image viewer by touching the two devices together 47, as described in relation to the first embodiment. Alternatively, the image could be presented to user B on device 42 once the conversation has finished 48, or the image could be stored on device 42 for later viewing.

The example illustrated in FIG. 4 demonstrates one of the advantages of the preferred embodiments of the present invention: since the received data is handled automatically at device 40, user A is able to communicate data to user B without interrupting their telephone conversation. It should be understood that as part of the automatic data handling process, a user may be required to authorise the data transfer by providing an input at either the sending or receiving device. The input may be a single key press and the key may be a dedicated key for authorising data transfer.

The embodiments described above and shown in FIGS. 2, 3 and 4 are just three examples of the ways in which data may be communicated to a user device and integrated with a functionality of the device. Further examples of the context-sensitive handling of data according to embodiments of the present invention are given below. These examples list two factors upon which the way of integrating data at the user device may be selected: the nature of the data received at the user device and the nature of the task being performed at the user device. The way in which the data is integrated with a functionality of the device is then given.

Receiving an image while browsing other images in an image viewer: the image is displayed.

Receiving a message while writing a message in a messaging program: the received message is attached to the open message.

Receiving a calendar entry while working in an electronic calendar: the calendar entry is added to the calendar.

Receiving a business card while working in an electronic address book: the business card is added to the address book.

Receiving a URL while browsing the internet: the URL is opened in the web browser.

Receiving a file while writing an email in an email client: the file is attached to the open message.

Receiving money electronically while browsing an online store account or bank account: the money is transferred to the online store account or bank account.

Receiving an image while writing a message: the image is immediately displayed.

Receiving an image while communicating via instant messaging: the image is sent to the user device with which the instant messaging session is being held.

This list is not exhaustive and provides just a few examples of the ways in which data may be handled by a user device. Note that in the above examples a way of integrating the data with a functionality of the device is selected in dependence on the type of data being communicated between the user devices and the activity available to the user at the receiving user device. However, as previously discussed, the selection may be dependent on one or more of the data type, the task being performed at the user device and the nature of the transmitting device, among other factors.

The functionality with which the received data is integrated at the receiving device may be further or alternatively chosen on the basis of the functionality with which the data may be handled at the transmitting device. This information may be transmitted to the receiving user device alongside the core data (such as a computer file).

It is well known in the art for user devices to display a screensaver on their display screen after a period of inactivity. It should be understood that screensavers do not provide an activity to a user and therefore in a preferred embodiment a screensaver would not be considered in the selection of a way of integrating data with a functionality of the user device. As an example, consider a user in the process of writing an email on a PDA. If the user takes a few moments to compose their thoughts the screensaver may start up. The user may then decide to transfer data to their PDA from another device and will therefore go through the process shown in FIG. 2. The fact that the screensaver is being displayed on the user device will not affect the way in which the data is integrated with a functionality of the user device and the data will be transferred in dependence on the fact that the currently active device activity is the writing of an email.

It will be understood that an activity may be made available at a user device in a number of ways. For example, the activity may be at least part of an application or program which has the system or input focus, or which is displayed to the user at the forefront of the operating environment, or which comprises one or more active system processes. The program or application may be embodied in software or in hardware, or in some combination of the two.

In a preferred embodiment (and in the three described embodiments) data exchange between two user devices is initiated by touching the devices together (or at least bringing them into close proximity). One possible device configuration is shown in FIG. 1. A radio frequency identification (RFID) transponder 14 is incorporated into each user device 10 which uniquely identifies each device. This allows two compatible user devices to recognize one another when brought into sufficiently close proximity. An authentication system may be enforced so that each user device may determine whether it is permitted to exchange data with a given other user device. This authentication process may require input from the user. The permissions may be stored in each user device as a set of rules. The permissions may further specify the nature of the data that may be transferred to a given user device. For user devices enabled with Bluetooth technology, each user device may be required to pair with each other user device with which it is required to communicate.

Consider the case in which the communication event shown in FIG. 2 occurs between two user devices of the type shown in FIG. 1. User A selects the image to be transmitted by viewing image 25 stored on device 21. User A then touches device 21 to device 22 and the devices identify themselves to one another by means of their embedded RFID tags 14. This step also serves to notify each device that a data transfer is desired by the user(s). If permission exists for the transfer of data between those devices, or if one or more of the users grants permission, or if permission is not required, then the selected image is transmitted from device 21 to device 22.

There are a number of ways in which a pair of user devices operating under the touch system may determine which device is the transmitting device and which device is the receiving device. The direction of data transfer may depend upon the tasks being performed at the transmitting and receiving devices. The tasks themselves (such as the applications being used at each device) may dictate the direction of data transfer. There may be a set of rules accessible at each user device to determine the direction of data transfer in various scenarios. For instance, if a user is browsing images at a first device and writing a message at a second device, the devices could be set up so that the open image is sent to the second device, rather than (say) the message being sent to the first device. If conflicts occur between the rules at the first and second devices, the user may be prompted to resolve the conflict.

Alternatively, the direction of data transfer may be dependent on the type of each user device. For example, if one of the devices is a 'fixed infrastructure' device such as a wall-mounted display screen, the other (mobile) device may assume it is doing the touching and is therefore the transmitting device.

Data could be transferred in both directions when a pair of user devices touch. Each device could then handle the received data in one of the ways discussed above. If data transfer is only required in one direction, one device in a pair might be configured to discard received data so that the effective data transfer is one-way. Data transfer could take place between three or more devices touching together.

In a preferred embodiment the direction of data transfer is determined from the physical motion of the pair of devices. A user will naturally touch the transmitting device to the receiving device in such a way that the transmitting device will move more rapidly than the receiving device in the moments before the devices touch. Alternatively the devices may be configured so that the user initiates data transfer by sweeping the transmitting device past the receiving device. The speed with which the transmitting device moves may be determined from the variations in the signal strength or the interference pattern of a signal being received at the transmitting device. The signal may be any kind of suitable wireless communications signal, such as may be used in accordance with the GSM, 3G or Bluetooth architectures. The choice of signal used to determine the speed of motion of a given user device may depend on the signal types supported at that device. The pair of touching devices may monitor for changes in the signal strength or interference pattern of a signal originating at a third device. Thus, the data may be transferred from the device that was determined to have moved more rapidly in the moments before the data transfer. The determination could be made by identifying which of the devices experienced the greater variation in received signal strength, e.g. from a third device, or in received interference over a predetermined time period (e.g. 1 s or 0.5 s) prior to data transfer.

In another embodiment, data transfer may be initiated by any available user input, such as a button, through a menu item, by opening a sliding panel, or by voice command.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method comprising:
    receiving data at a first user device from a second user device, wherein the first user device and the second user device are independently operable;
    automatically selecting, by the first device, a way of integrating the data with a functionality of the first user device based, at least in part, on a nature of an activity being made available to a user by the first user device; and
    causing, at least in part, an integration of the data with the functionality in the selected way.

2. A method according to claim 1, wherein the data is selected at the second user device for transmission to the first user device.

3. A method according to claim 2, wherein the first and second user devices communicate in accordance with a wireless network architecture.

4. A method according to claim 2, wherein the functionality is offered at least in part by a computer program having instant messaging capabilities and the integrating step involves sending the data to an instant messenger contact.

5. A method according to claim 1, wherein the selection of the way of integrating the data is further based, at least in part, on a nature of the second user device.

6. A method according to claim 1, wherein the selection of the way of integrating the data is further based, at least in part, on the nature of the data.

7. A method according to claim 1, wherein the transmission of the data from the second user device to the first user device is automatically performed when the first and second devices enter into proximity with one another.

8. A method according to claim 7, wherein the first and second devices include radio frequency identification transponders.

9. A method according to claim 1, wherein the transmission of the data from the second user device to the first user device is triggered by user input means at the second user device.

10. A method according to claim 1, wherein the integration of the data is performed in accordance with a set of predetermined rules.

11. A method according to claim 10, wherein the rules are stored on the first user device.

12. A method according to claim 10, wherein the rules are stored remotely from the first user device.

13. A method according to claim 1, further comprising:
    the first and second user devices authenticating one another prior to the transmission from the second user device.

14. A method according to claim 13, wherein at least the first user device accesses a set of permissions containing information necessary for the authenticating step.

15. A method according to claim 14, wherein the permissions are stored at the first user device.

16. A method according to claim 14, wherein the permissions are stored remotely from the first user device.

17. A method according to claim 1, wherein the first and second user devices communicate in accordance with the Bluetooth architecture.

18. A method according to claim 17, wherein the first and second user devices are paired at least in an initial instance that the first and second user devices attempt to communicate.

19. A method according to claim 1, wherein the functionality is offered at least in part by a computer program having messaging capabilities and the integrating step involves attaching the data to a message.

20. A method according to claim 1, wherein the functionality is offered at least in part by a computer program having image display capabilities, the data represents an image, and the integrating step involves displaying the image.

21. A method according to claim 1, wherein the functionality is offered at least in part by a computer program having web browsing capabilities, the data represents a web link, and the integrating step involves accessing data stored at the link.

22. A method according to claim 1, wherein the data represents a sum of money or a form of electronic payment.

23. A method according to claim 22, wherein the integrating step involves transferring money or a form of electronic payment to or from the first user device.

24. A method according to claim 1, wherein the activity being made available to a user is a real-time communications activity.

25. A method according to claim 24, wherein the activity is a telephone conversation.

26. A method according to claim 24, wherein the activity is instant messaging.

27. A method according to claim 1, wherein the data comprises:

primary data for interpretation at an application level; and
secondary data indicating a format in which the primary data is to be interpreted.

28. A user device comprising:
a receiver for receiving data from another user device, wherein the user device and the other user device are independently operable; and
processing means arranged to automatically select a way of integrating the data with a functionality of the user device based, at least in part, on a nature of an activity being made available to a user by the user device, and to integrate the data with the functionality in the selected way.

29. An apparatus comprising:
at least one processor; and
at least one memory including computer program code for one or more programs,
the at least one memory and the computer program code configured to, with the at least one processor, cause the apparatus to perform at least the following,
receive data from another apparatus, wherein the apparatus and the other apparatus are independently operable;
automatically select a way of integrating the data with a functionality of the apparatus based, at least in part, on a nature of an activity being made available to a user of the apparatus; and
cause, at least in part, an integration of the data with the functionality in the selected way.

* * * * *